US010565185B2

(12) United States Patent
Gross et al.

(10) Patent No.: US 10,565,185 B2
(45) Date of Patent: Feb. 18, 2020

(54) MSET-BASED PROCESS FOR CERTIFYING PROVENANCE OF TIME-SERIES DATA IN A TIME-SERIES DATABASE

(71) Applicant: Oracle International Corporation, Redwood Shores, CA (US)

(72) Inventors: Kenny C. Gross, Escondido, CA (US); Dieter Gawlick, Palo Alto, CA (US); Zhen Hua Liu, San Mateo, CA (US); Mengying Li, La Jolla, CA (US)

(73) Assignee: Oracle International Corporation, Redwood Shores, CA (US)

( * ) Notice: Subject to any disclaimer, the term of this patent is extended or adjusted under 35 U.S.C. 154(b) by 197 days.

(21) Appl. No.: 15/850,027

(22) Filed: Dec. 21, 2017

(65) Prior Publication Data

US 2019/0197145 A1    Jun. 27, 2019

(51) Int. Cl.
*G06F 17/00* (2019.01)
*G06F 16/23* (2019.01)
*G06F 16/2458* (2019.01)

(52) U.S. Cl.
CPC ...... *G06F 16/2365* (2019.01); *G06F 16/2477* (2019.01)

(58) Field of Classification Search
CPC .......................... G06F 16/2365; G06F 16/2477
USPC ................................................. 707/600–899
See application file for complete search history.

(56) References Cited

U.S. PATENT DOCUMENTS

2005/0015205 A1*  1/2005  Repucci ............. G06K 9/00523
                                                                    702/10

OTHER PUBLICATIONS

Gross et al.; "Application of a Model-based Fault Detection System to Nuclear Plant Signals", 9th International Conference on Intelligent Systems Applications to Power Systems, Seoul Korea, 1997 ./.

* cited by examiner

*Primary Examiner* — Isaac M Woo
(74) *Attorney, Agent, or Firm* — Park, Vaughan, Fleming & Dowler LLP

(57) ABSTRACT

The disclosed embodiments relate to a system that certifies provenance of time-series data in a time-series database. During operation, the system retrieves time-series data from the time-series database, wherein the time-series data comprises a sequence of observations comprising sensor readings for each signal in a set of signals. The system also retrieves multivariate state estimation technique (MSET) estimates, which were computed for the time-series data, from the time-series database. Next, the system performs a reverse MSET computation to produce reconstituted time-series data from the MSET estimates. The system then compares the reconstituted time-series data with the time-series data. If the reconstituted time-series data matches the original time-series data, the system certifies provenance for the time-series data.

14 Claims, 5 Drawing Sheets
(2 of 5 Drawing Sheet(s) Filed in Color)

MSET-BASED PROCESS FOR CERTIFYING PROVENANCE OF TIME-SERIES DATA IN A TIME-SERIES DATABASE

BACKGROUND

Field

The disclosed embodiments generally relate to techniques for certifying provenance for data stored in database systems. More specifically, the disclosed embodiments relate to a process that uses the Multivariate State Estimation Technique (MSET) to certify provenance for time-series data stored in a time-series database.

Related Art

Enormous numbers of sensors are presently being deployed to monitor the operational health of critical assets in various systems. For example, a medium-sized computer data center can include over 1,000,000 sensors monitoring thousands of business-critical servers, a modern passenger jet can include 75,000 sensors, and an oil refinery can include over 1,000,000 sensors. These sensors produce large volumes of time-series data, which is typically stored in time-series databases. As these time-series databases continue to grow, it is becoming increasingly important to be able to certify "provenance" of the time-series data to prove that no data has been altered. It is also important to be able to quickly discover and prove that data has been corrupted, altered, or substituted, whether the data corruption originated from users with malicious intent or from error mechanisms.

Data-provenance techniques operate by associating derived data with corresponding inputs, processing steps, and physical-processing environment. Such data-provenance techniques are becoming increasingly important in production environments that produce thousands of new data sets every day from an "anchor" database, which is supposed to contain original measured or computed time-series data. The validity of all "derived" data in new data sets fundamentally depends on the provenance of the original "anchor" time-series database. Moreover, data-provenance techniques can be used to facilitate debugging, performance optimization, and derived data quality, and also to ensure repeatable results. For example, by comparing provenance between dataflow executions, it is possible to determine the cause of erroneous results, which, for example, can be caused by changed inputs or modified processing steps.

Data-provenance techniques can also be audited to ensure compliance with various State and Federal regulations. Data provenance has also become important for a large number of new data-privacy agreements and data-sharing agreements. For all such statutory and contractual legal agreements, there is a presupposed auditability process, which depends in a fundamental way on data provenance.

Hence, what is needed is a technique for effectively and efficiently certifying provenance of time-series data stored in a time-series database.

SUMMARY

The disclosed embodiments relate to a system that certifies provenance of time-series data in a time-series database. During operation, the system retrieves time-series data from the time-series database, wherein the time-series data comprises a sequence of observations for each signal in a set of signals. The system also retrieves multivariate state estimation technique (MSET) estimates, which were computed for the time-series data, from the time-series database. Next, the system performs a reverse MSET computation to produce reconstituted time-series data from the MSET estimates. The system then compares the reconstituted time-series data with the time-series data. If the reconstituted time-series data matches the original time-series data, the system certifies provenance for the time-series data.

In some embodiments, prior to retrieving the time-series data, the system computes the MSET estimates from the time-series data, and stores the MSET estimates in the time-series database.

In some embodiments, computing the MSET estimates from the time-series data involves: performing an analytical resampling process on the time-series data to resample and synchronize signals in the time-series data; empirically separating signals in the time-series data into a set of clusters of correlated signals; and computing MSET estimates for each cluster in the set of clusters.

In some embodiments, computing MSET estimates for a cluster in the set of clusters involves: separating observations for signals in the cluster into an odd set for odd-numbered observations, and an even set for even-numbered observations; training an MSET model for the even set to produce MSET estimates for the odd set; training an MSET model for the odd set to produce MSET estimates for the even set; and merging the MSET estimates for the odd set with the MSET estimates for the even set to produce MSET estimates for the cluster.

In some embodiments, storing the MSET estimates in the time-series database includes storing the MSET estimates along with sensor operability flags indicating whether sensors that generated signals in the time-series data have been validated as operational, or have exhibited anomalous behavior.

In some embodiments, computing the MSET estimates from the time-series data comprises applying an SQL aggregation function over the time-series data to compute an MSET pattern object, which includes the MSET estimates.

In some embodiments, the system certifies provenance of another set of time-series data by using the MSET pattern object as a dynamic check constraint pattern over the other set of time-series data.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
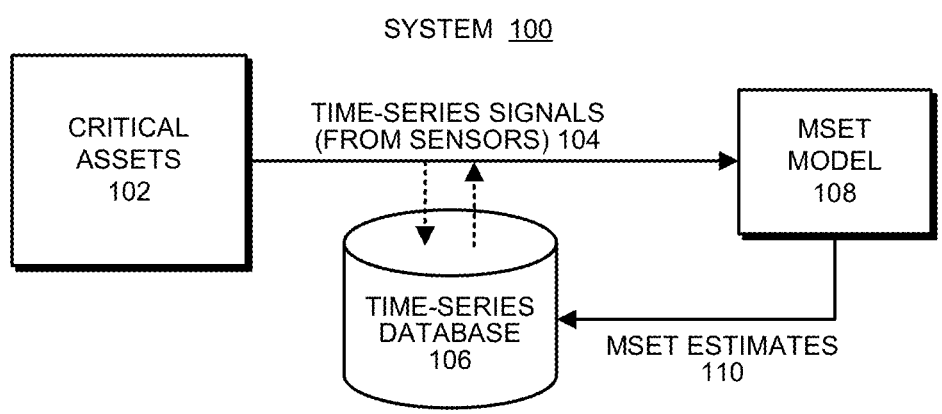
FIG. 1 illustrates an exemplary system that computes MSET estimates from time-series data and stores the MSET estimates in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Our primary goal for integrating an MSET-based provenance-certification technique into a dataflow process in a database system is to facilitate enhanced anomaly discovery for end customers, and to facilitate signal validation and sensor operability validation for customer time-series databases that originate from sensors monitoring critical assets across a variety of important Internet of Things (IoT) industries. This latter feature recognizes that for customers who ingest large volumes of time-series signals, which originate from systems with physical transducers, it is often the case that some proportion of the sensors are degrading, drifting out of calibration or could be failed with 'stuck-at' faults. Also, when there are intermittent problems with sensors or with "upstream" data-acquisition electronics, individual time series may contain missing values. When these types of anomalies are undiscovered as the data is captured into the database, and when the end customer needs to subsequently make use of their time-series database (e.g., for product development, performance evaluation, or other scientific purposes), the accuracy of their analyses (and in some cases the soundness of the conclusions they are able to draw) can be affected by the above-listed types of anomalies that the new MSET-based dataflow process will "passively" detect in the background, shortly after the original data is ingested.

During this new MSET-based dataflow process, all observations from all signals are first preprocessed and optimally resampled and "harmonized" using an analytical resampling process. MSET is then applied to these optimally resampled and synchronized signals to identify all signals in the database that have any degree of association with any other signals to form corresponding "clusters" of signals. This is done for the full universe of signals as a whole, and separately for clusters of signals. Note that this clustering approach recognizes that the full database of signals may have come from separate systems in a customer facility, or from separate assets in a customer fleet. After MSET is used to discover the correlations among signals, MSET is used to compute a highly accurate "MSET estimate" for each signal in the database, based upon the empirical correlation patterns learned between each signal and other signals in the database. Those highly accurate MSET estimates are stored along with the original raw signals. Also stored are "sensor operability flags," wherein a given flag contains a "1" value for signals generated by fully validated sensors, and a "0" value for signals for which anomalies were discovered in a corresponding sensor that measured the original raw signal.

Now that the MSET estimates are stored with the original raw time-series telemetry values, we exploit the fact that MSET is a deterministic (but complex) mathematical process, and it is "reversible," which is a fundamental key for enhanced provenance. Big data analytics researchers commonly employ neural networks (NNs), and support vector machines (SVMs), for anomaly detection. All the approaches (MSET, NNs, and SVMs) are, on a black-box level, nonlinear, nonparametric (NLNP) regression techniques. NLNP regression is a preferred technique for the above time-series dataflow process, primarily because an NLNP machine-learning technique makes no assumptions about the linear or nonlinear relationships among the time-series "signals," but instead learns those relationships empirically. However, of these three NLNP machine-learning approaches, NNs and SVMs both employ stochastic optimization of the weights. For NNs, the stochastic optimization of weights occurs between perceptron layers. For SVMs, the stochastic optimization occurs in the convex quadratic-programming optimization of the regularization parameter to keep a balance between bias and variance in the SVM estimates.

In both cases, NNs and SVMs, if the pattern recognition is trained with data from Monday, versus if it is trained with data from Tuesday, the relationship between the output estimates and the input raw signals will be extremely similar. However, if one "looks into" the black box at the intermediate weights for the Monday computation versus for the Tuesday computation, the intermediate weights will be vastly different. Machine-learning researchers will point out that for empirical pragmatic applications of pattern recognition, as long as the outputs of the black box are accurate estimates of the underlying time series, then from that pragmatic perspective, nobody should care that the weights inside the black box can be substantially different every time the black box is run. However, for purposes of provenance enhancement, we are incorporating MSET into a novel time-series dataflow process, so that if any of the original raw data streams were ever to be modified, altered, or substituted, either by a user with malicious intentions or accidentally through an error, the fact that MSET is a deterministic algorithm and is reversible will allow the original raw data to be validated for provenance certification any time in the future.

We have two models for integrating MSET into a dataflow process within a database: (1) constraint-based MSET integration; and (2) aggregation-query-based MSET integration. For (1), a set of time-series data in a collection is associated with a self-maintained MSET pattern object that can act as a constraint enforcement. That is, we propose that MSET be used as a non-obvious extension of conventional SQL constraint/data rule enforcement. Traditionally, an SQL constraint/data-rule specification is expressed using thresholds (such as check (heart_rate<150)). But, now, we are replacing it with an MSET-computed pattern object. The existing constraint enforcement policy (deferred/immediate/placing into offending collections) and trigger firing in a database management system (DBMS) can now be fully leveraged.

For example, see the SQL code below.

```
alter table my_sensor_data add constraint sensor_monitor check
   (VALIDATE(MSET(ts_data)))
```

For (2), this approach is very flexible as MSET is treated as an aggregation function over a set of time-series data to return the "MSET pattern object." Any SQL query which yields a set of time-series data can be fed into the MSET( ) function to compute an MSET pattern object. The computed MSET pattern object is then used as a dynamic check constraint pattern over another set of time-series data. For example, see the SQL code below.

```
VALIDATE (select ts_data from mystore_sensor_data)
USING
   (select MSET(ts_data) from yourstore_sensor_data)
```

Exemplary System

FIG. 1 illustrates an exemplary system that computes MSET estimates from time-series data and stores the MSET estimates in accordance with the disclosed embodiments. As illustrated in FIG. 1, system 100 operates on a set of time-series signals 104 obtained from sensors in one or more critical assets 102. Note that critical assets 102 can generally include any type of machinery or facility, which includes sensors and generates time-series signals. Moreover, time-series signals 104 can originate from any type of sensor, which can be located in a component in critical assets 102, including: a voltage sensor; a current sensor; a pressure sensor; a rotational speed sensor; and a vibration sensor.

During operation of system 100, time-series signals 104 can feed into a time-series database 106, which stores the time-series signals 104 for subsequent analysis. Next, the time-series data 104 either feeds directly from critical assets 102 or from time-series database 106 into MSET pattern-recognition model 108. (For a further description of MSET, please see Gross, K. C., R. M. Singer, S. W. Wegerich, J. P. Herzog, R. Van Alstine, and F. K. Bockhorst, "Application of a Model-based Fault Detection System to Nuclear Plant Signals," Proc. 9th Intl. Conf. on Intelligent Systems Applications to Power Systems, Seoul, Korea, 1997.)

Next, the MSET pattern-recognition model 108 is "trained" to learn patterns of correlation among all of the time-series signals 104. After the training is complete, the MSET pattern-recognition model 108 is used to produce MSET estimates 110 from subsequent time-series signals 104. The MSET estimates are then stored in time-series database 106 along with the original time-series signals 104.

Prognostic-Surveillance Operation

Figure 2:
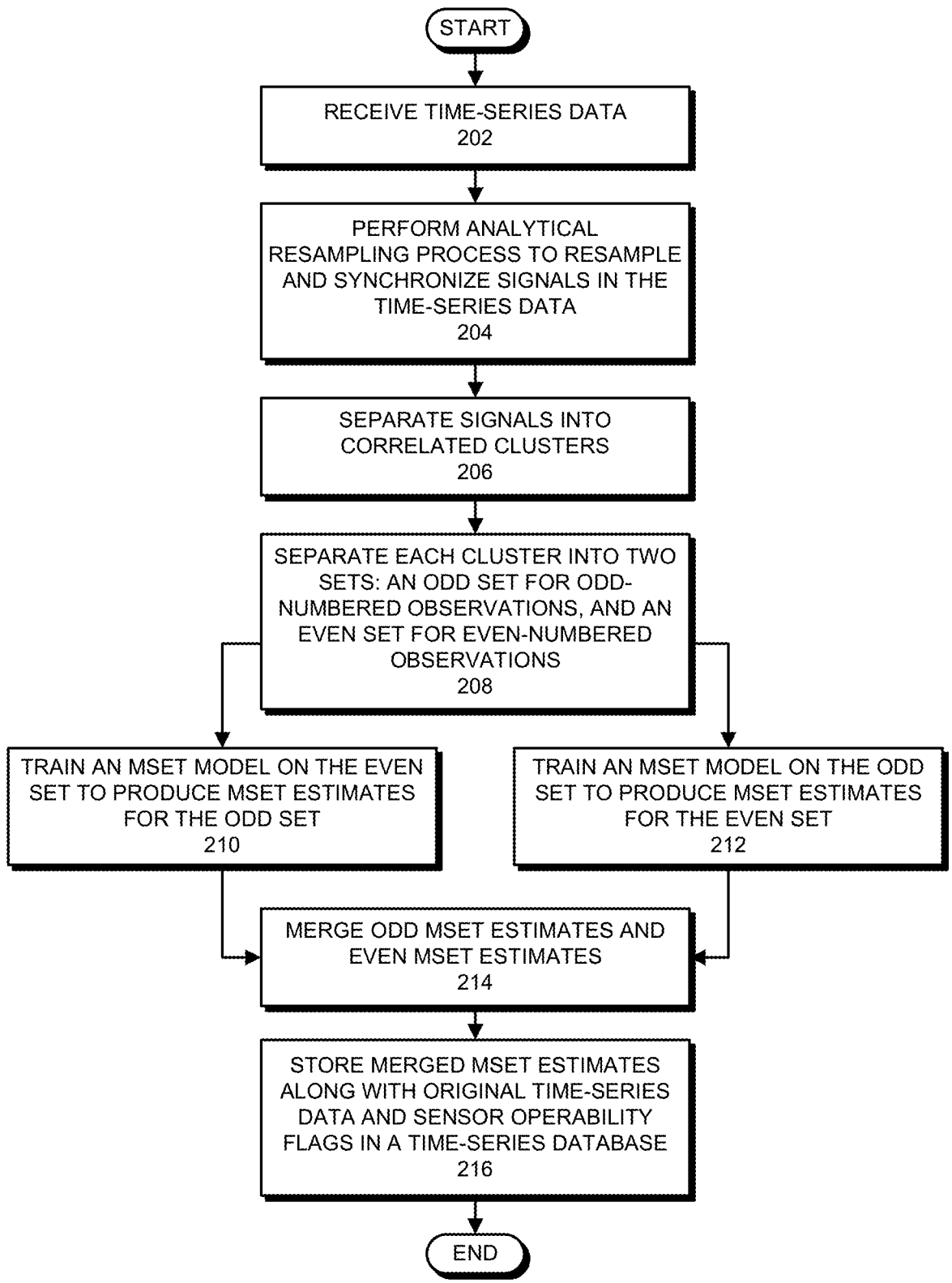
FIG. 2 presents a detailed flowchart illustrating how the MSET estimates are computed in accordance with the disclosed embodiments.

FIG. 2 presents a detailed flowchart illustrating how the MSET estimates are computed in accordance with the disclosed embodiments. The process starts when the system receives time-series data (step 202). Next, the system performs an analytical resampling process to resample and synchronize signals in the time-series data (step 204). The process of analytically resampling and optimizing telemetry data can involve using one or more of the techniques described in: "Barycentric Coordinate Technique for Resampling Quantized Signals," by inventors Sajit Thampy, Kenny C. Gross, and Keith A. Whisnant, having Ser. No. 11/210,570, and a filing date of 23 Aug. 2005; and "Optimizing Synchronization Between Monitored Computer System Signals," by inventors Kenny C. Gross and Yujuan Bao, having Ser. No. 10/955,195, and a filing date of 29 Sep. 2004. The above-listed patent applications are hereby incorporated by reference herein to explain the process of analytically resampling telemetry data.

The system then separates the signals into correlated clusters of signals (step 206). This can be accomplished by applying the Tri-Point Clustering (TPC) technique to the resampled signals to identify all signals that have any degree of association with any other signals to ultimately form "clusters" of signals. (See U.S. Pat. No. 9,514,213, entitled "Pre-Attribute Clustering Using Tri-Point Data Arbitration," by inventors Alan P. Wood, et al., issued on Dec. 6, 2016 and filed on Mar. 15, 2013, which is hereby incorporated by reference.)

Next, the system separates each cluster into two sets: an odd set of odd-numbered observations, and an even set of even-numbered observations (step 208). Then, the system trains an MSET model on the even set to produce MSET estimates for the odd set (step 210), and also trains an MSET model on the odd set to produce MSET estimates for the even set (step 212). The system then merges the odd MSET estimates with the even MSET estimates (step 214). Finally, the system stores the merged MSET estimates along with the original time-series data and sensor operability flags in a time-series database (step 216).

Figure 3:
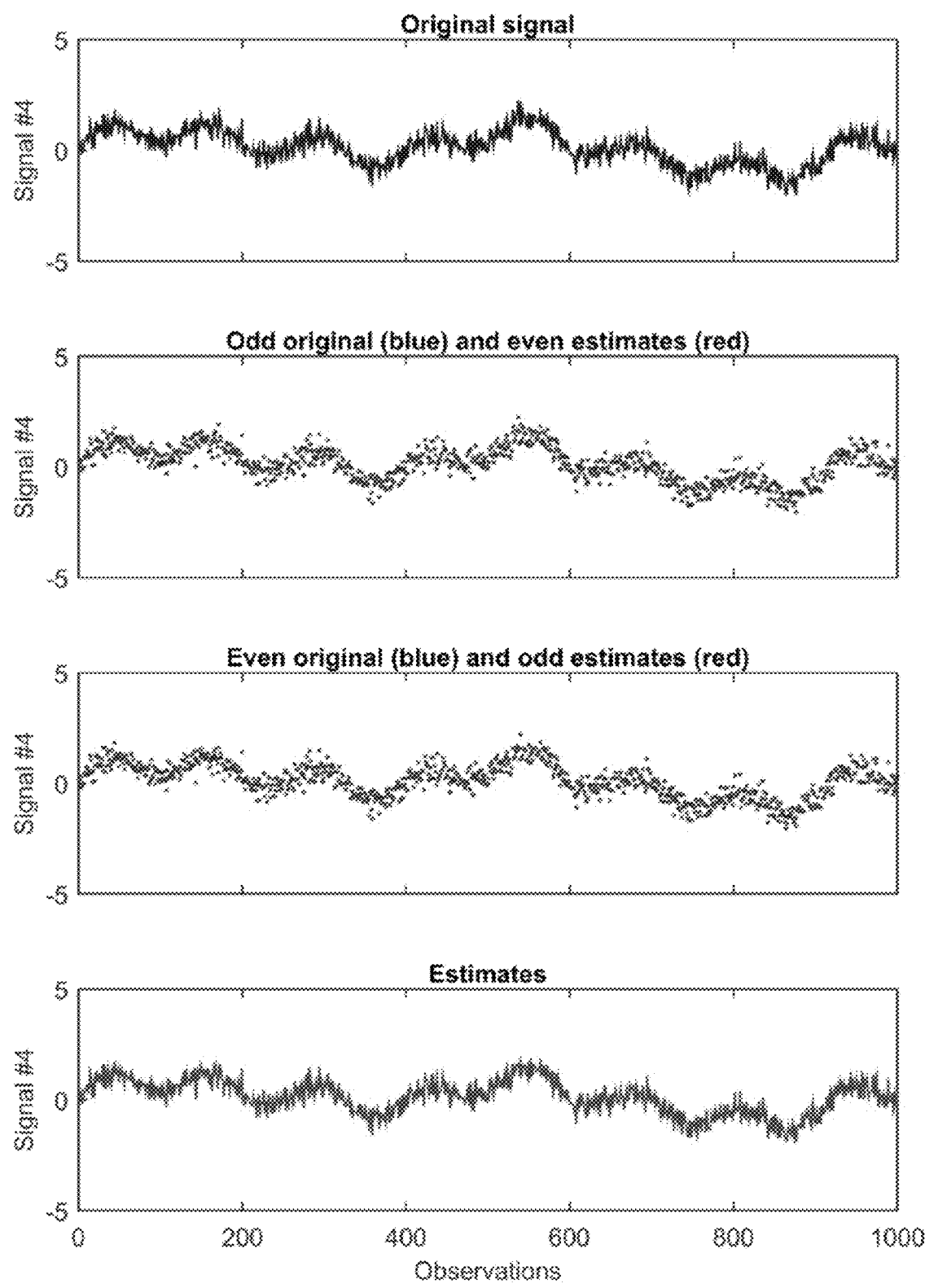
FIG. 3 presents a graph illustrating how even MSET estimates are computed from odd observations and odd MSET estimates are computed from even observations in accordance with the disclosed embodiments.

FIG. 3 presents a graph illustrating how even MSET estimates are computed from odd observations and odd MSET estimates are computed from even observations as occurs in steps 210 and 212 described above. The top graph in FIG. 3 illustrates the original time-series signal in blue. The second graph illustrates odd original samples as blue dots, and resulting even estimates as red dots. The third graph illustrates even original samples as blue dots, and resulting odd estimates as red spots. Finally, the fourth graph illustrates a signal comprising the combined estimates.

Figure 4:
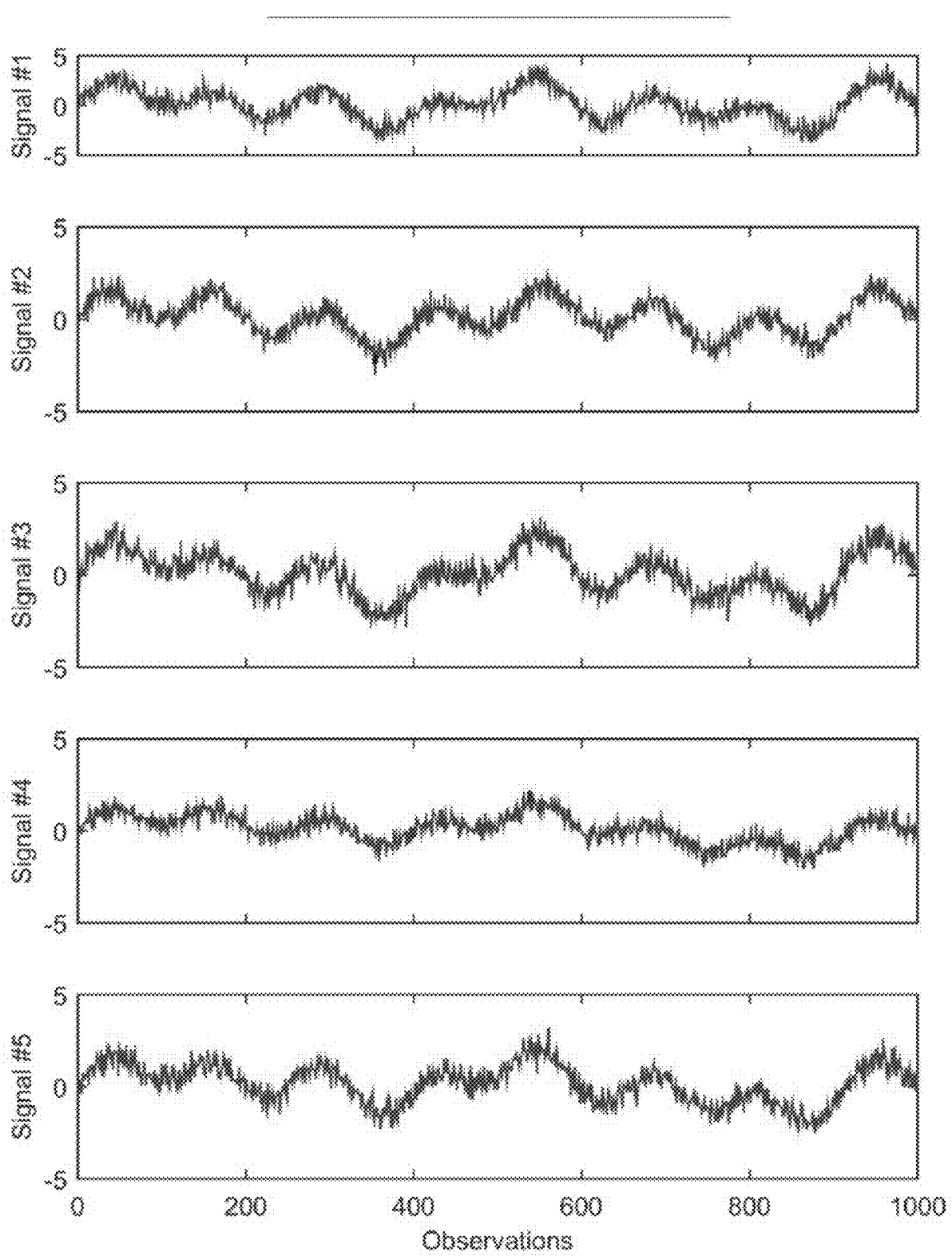
FIG. 4 presents a graph illustrating MSET estimates overlaid on original signals in accordance with the disclosed embodiments.

FIG. 4 presents a graph illustrating MSET estimates (in red) overlaid on top of original signals (in blue) for five exemplary signals in accordance with the disclosed embodiments. Note that the estimates are very close to the original signals, so very little of the blue original signals is visible.

Process of Certifying Provenance

Figure 5:
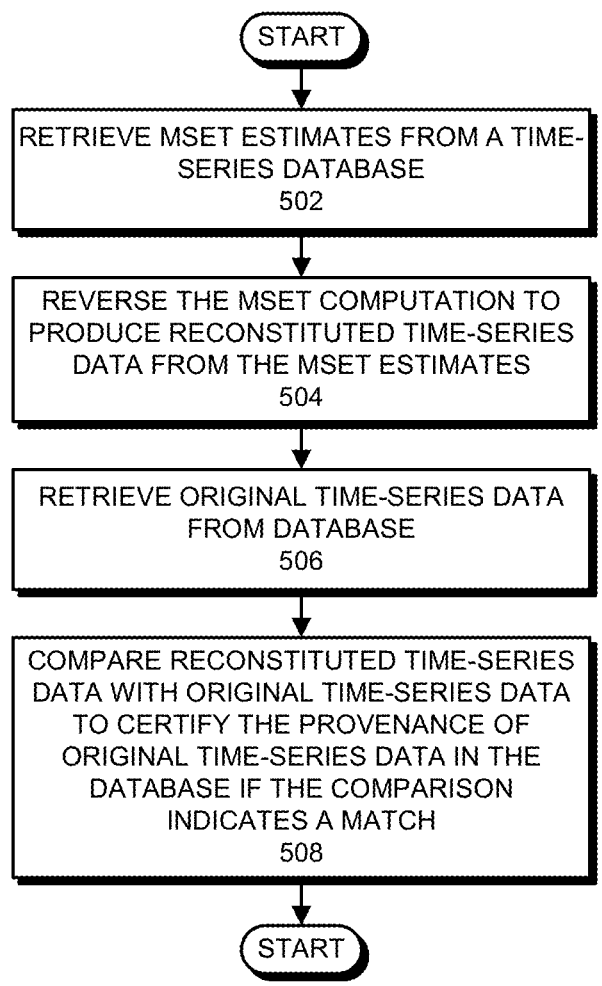
FIG. 5 presents a flowchart illustrating the process of certifying the provenance of time-series data based on corresponding MSET estimates in accordance with the disclosed embodiments.

FIG. 5 presents a flowchart illustrating the process of certifying the provenance of time-series data based on corresponding MSET estimates in accordance with the disclosed embodiments. The process starts when the system retrieves MSET estimates from a time-series database (step 502). Next, the system reverses the MSET computation to produce reconstituted time-series data from the MSET estimates (step 504). As mentioned above, MSET is a reversible process, which means that performing the reverse MSET computation on the MSET estimates will reconstitute the original time-series data. The system then retrieves the original time-series data from the database (step 506). Finally, the system compares the reconstituted time-series data with the original time-series data to certify provenance of the original time-series data if the comparison indicates a match (step 508).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for certifying provenance of time-series data in a time-series database, comprising:
   retrieving time-series data from the time-series database, wherein the time-series data comprises a sequence of observations comprising sensor readings for each signal in a set of signals;
   retrieving multivariate state estimation technique (MSET) estimates, which were computed for the time-series data, from the time-series database;
   performing a reverse MSET computation to produce reconstituted time-series data from the MSET estimates;
   comparing the reconstituted time-series data with the time-series data;
   when the reconstituted time-series data matches the original time-series data, certifying provenance for the time-series data;
   prior to retrieving the time-series data, computing the MSET estimates from the time-series data by:
      performing an anlytical resampling process (ARP) on the time-series data to resample and synchronize signals in the time-series data,
      empirically separating signals in the time-series data into a set of clusters of correlated signals, and
      computing MSET estimates for each cluster in the set of clusters; and
   storing the MSET estimates in the time-series database.

2. The method of claim 1, wherein computing MSET estimates for a cluster in the set of clusters comprises:
   separating observations for signals in the cluster into an odd set for odd-numbered observations, and an even set for even-numbered observations;
   training an MSET model for the even set to produce MSET estimates for the odd set;
   training an MSET model for the odd set to produce MSET estimates for the even set; and
   merging the MSET estimates for the odd set with the MSET estimates for the even set to produce MSET estimates for the cluster.

3. The method of claim 1, wherein storing the MSET estimates in the time-series database includes storing the MSET estimates along with sensor operability flags indicating whether sensors that generated signals in the time-series data have been validated as operational, or have exhibited anomalous behavior.

4. The method of claim 1, wherein computing the MSET estimates from the time-series data comprises applying an SQL aggregation function over the time-series data to compute an MSET pattern object, which includes the MSET estimates.

5. The method of claim 4, wherein the method further comprises certifying provenance of another set of time-series data by using the MSET pattern object as a dynamic check constraint pattern over the other set of time-series data.

6. A non-transitory, computer-readable storage medium storing instructions that when executed by a computer cause the computer to perform a method for certifying provenance of time-series data in a time-series database, comprising:
   retrieving time-series data from the time-series database, wherein the time-series data comprises a sequence of observations comprising sensor readings for each signal in a set of signals;
   retrieving multivariate state estimation technique (MSET) estimates, which were computed for the time-series data, from the time-series database;
   performing a reverse MSET computation to produce reconstituted time-series data from the MSET estimates;
   comparing the reconstituted time-series data with the time-series data;
   when the reconstituted time-series data matches the original time-series data, certifying provenance for the time-series data;
   prior to retrieving the time-series data, computing the MSET estimates from the time-series data by:
      performing an anlytical resampling process (ARP) on the time-series data to resample and synchronize signals in the time-series data,
      empirically separating signals in the time-series data into a set of clusters of correlated signals, and
      computing MSET estimates for each cluster in the set of clusters; and
   storing the MSET estimates in the time-series database.

7. The non-transitory, computer-readable storage medium of claim 6, wherein computing MSET estimates for a cluster in the set of clusters comprises:
   separating observations for signals in the cluster into an odd set for odd-numbered observations, and an even set for even-numbered observations;
   training an MSET model for the even set to produce MSET estimates for the odd set;
   training an MSET model for the odd set to produce MSET estimates for the even set; and
   merging the MSET estimates for the odd set with the MSET estimates for the even set to produce MSET estimates for the cluster.

8. The non-transitory, computer-readable storage medium of claim 6, wherein storing the MSET estimates in the time-series database includes storing the MSET estimates along with sensor operability flags indicating whether sensors that generated signals in the time-series data have been validated as operational, or have exhibited anomalous behavior.

9. The non-transitory, computer-readable storage medium of claim 6, wherein computing the MSET estimates from the time-series data comprises applying an SQL aggregation function over the time-series data to compute an MSET pattern object, which includes the MSET estimates.

10. The non-transitory, computer-readable storage medium of claim 9, wherein the method further comprises certifying provenance of another set of time-series data by using the MSET pattern object as a dynamic check constraint pattern over the other set of time-series data.

11. A system that certifies provenance of time-series data in a time-series database, comprising:
  at least one processor and at least one associated memory; and
  a provenance-certification mechanism that executes on the at least one processor, wherein during operation, the provenance-certification mechanism:
    retrieves time-series data from the time-series database, wherein the time-series data comprises a sequence of observations comprising sensor readings for each signal in a set of signals;
    retrieves multivariate state estimation technique (MSET) estimates, which were computed for the time-series data, from the time-series database;
    performs a reverse MSET computation to produce reconstituted time-series data from the MSET estimates;
    compares the reconstituted time-series data with the time-series data;
    when the reconstituted time-series data matches the original time-series data, certifies provenance for the time-series data;
    prior to retrieving the time-series data, computing the MSET estimates from the time-series data by:
      performing an anlytical resampling process (ARP) on the time-series data to resample and synchronize signals in the time-series data,
      empirically separating signals in the time-series data into a set of clusters of correlated signals, and
      computing MSET estimates for each cluster in the set of clusters; and
    stores the MSET estimates in the time-series database.

12. The system of claim 11, wherein while computing MSET estimates for a cluster in the set of clusters, the provenance-certification mechanism:
    separates observations for signals in the cluster into an odd set for odd-numbered observations, and an even set for even-numbered observations;
    trains an MSET model for the even set to produce MSET estimates for the odd set;
    trains an MSET model for the odd set to produce MSET estimates for the even set; and
    merges the MSET estimates for the odd set with the MSET estimates for the even set to produce MSET estimates for the cluster.

13. The system of claim 11, wherein while storing the MSET estimates in the time-series database, the provenance-certification mechanism stores the MSET estimates along with sensor operability flags indicating whether sensors that generated signals in the time-series data have been validated as operational, or have exhibited anomalous behavior.

14. The system of claim 11, wherein while computing the MSET estimates from the time-series data, the provenance-certification mechanism applies an SQL aggregation function over the time-series data to compute an MSET pattern object, which includes the MSET estimates.

* * * * *

UNITED STATES PATENT AND TRADEMARK OFFICE
CERTIFICATE OF CORRECTION

PATENT NO.         : 10,565,185 B2
APPLICATION NO.    : 15/850027
DATED              : February 18, 2020
INVENTOR(S)        : Gross et al.

It is certified that error appears in the above-identified patent and that said Letters Patent is hereby corrected as shown below:

In the Claims

In Column 7, Line 45, in Claim 1, delete "anlytical" and insert -- analytical --, therefor.

In Column 8, Line 35, in Claim 6, delete "anlytical" and insert -- analytical --, therefor.

In Column 9, Line 28, in Claim 11, delete "computing" and insert -- computes --, therefor.

In Column 9, Line 30, in Claim 11, delete "anlytical" and insert -- analytical --, therefor.

Signed and Sealed this
Third Day of November, 2020

Andrei Iancu
*Director of the United States Patent and Trademark Office*